United States Patent
Bedard et al.

(10) Patent No.: US 9,864,205 B2
(45) Date of Patent: Jan. 9, 2018

(54) MULTIFOCAL DISPLAY

(71) Applicants: Noah Bedard, San Francisco, CA (US); Patrick Llull, Durham, NC (US); Ivana Tosic, Berkeley, CA (US); Wanmin Wu, Foster City, CA (US); Kathrin Berkner, Los Altos, CA (US)

(72) Inventors: Noah Bedard, San Francisco, CA (US); Patrick Llull, Durham, NC (US); Ivana Tosic, Berkeley, CA (US); Wanmin Wu, Foster City, CA (US); Kathrin Berkner, Los Altos, CA (US)

(73) Assignee: Ricoh Company, Ltd., Tokyo (JP)

(*) Notice: Subject to any disclaimer, the term of this patent is extended or adjusted under 35 U.S.C. 154(b) by 195 days.

(21) Appl. No.: 14/642,104

(22) Filed: Mar. 9, 2015

(65) Prior Publication Data

US 2016/0147078 A1    May 26, 2016

Related U.S. Application Data (60) Provisional application No. 62/084,315, filed on Nov. 25, 2014.

(51) Int. Cl.
*G02B 27/22* (2006.01)
*G02B 25/00* (2006.01)
(Continued)

(52) U.S. Cl.
CPC ........ *G02B 27/2278* (2013.01); *G02B 3/14* (2013.01); *G02B 13/0095* (2013.01);
(Continued)

(58) Field of Classification Search
None
See application file for complete search history.

(56) References Cited

U.S. PATENT DOCUMENTS 5,193,124 A    3/1993   Subbarao
5,227,890 A    7/1993   Dowski, Jr.
(Continued)

FOREIGN PATENT DOCUMENTS

EP    0814605    12/1997
EP    0998124     5/2000
(Continued)

OTHER PUBLICATIONS

Rooms, F et al, PSF Estimation with applications in autofocus and image restoration, IEEE 2002.
(Continued)

*Primary Examiner* — Claire X Pappas
*Assistant Examiner* — Christopher Kohlman
(74) *Attorney, Agent, or Firm* — Fenwick & West LLP (57) ABSTRACT

A multifocal display for rendering a 3D scene as a series of 2D images. In one aspect, the multifocal display includes a display, an optical imaging system, a refractive focus actuator and a controller. The display renders the 2D images. The optical imaging system is image-side telecentric and creates an image of the display. The refractive focus actuator is positioned at the pupil of the optical imaging system. Thus, adjusting the refractive focus actuator alters a location of the image of the display but does not significantly alter a size of the image. The controller coordinates adjustment of the refractive focus actuator with rendering of the 2D images on the display. The waveform driving the focus actuator is preferably designed to reduce ringing and jitter effects.

20 Claims, 6 Drawing Sheets

(51) Int. Cl.
*H04N 13/04* (2006.01)
*G02B 13/00* (2006.01)
*G02B 13/22* (2006.01)
*G02B 3/14* (2006.01)

(52) U.S. Cl.
CPC ........... *G02B 13/22* (2013.01); *G02B 25/001* (2013.01); *H04N 13/0497* (2013.01)

(56) References Cited

U.S. PATENT DOCUMENTS

| | | | |
|---|---|---|---|
| 5,521,695 | A | 5/1996 | Dowski |
| 5,550,935 | A | 8/1996 | Erdem et al. |
| 5,748,371 | A | 5/1998 | Cathey, Jr. et al. |
| 5,793,900 | A | 8/1998 | Nourbaksh et al. |
| 5,870,179 | A | 2/1999 | Cathey, Jr. et al. |
| 5,932,872 | A | 8/1999 | Price |
| 5,956,436 | A | 9/1999 | Chien |
| 6,021,005 | A | 2/2000 | Cathey, Jr. et al. |
| 6,069,738 | A | 5/2000 | Cathey, Jr. et al. |
| 6,519,359 | B1 | 2/2003 | Nafis et al. |
| 6,525,302 | B2 | 2/2003 | Dowski, Jr. et al. |
| 6,842,297 | B2 | 1/2005 | Dowski, Jr. |
| 6,873,733 | B2 | 3/2005 | Dowski, Jr. |
| 6,911,638 | B2 | 6/2005 | Dowski, Jr. et al. |
| 6,940,649 | B2 | 9/2005 | Dowski, Jr. |
| 7,027,221 | B2 | 4/2006 | Hamborg |
| 7,158,182 | B2 | 1/2007 | Watanabe et al. |
| 7,612,804 | B1 | 11/2009 | Marcu et al. |
| 8,411,931 | B2 | 4/2013 | Zhou et al. |
| 8,897,595 | B2 | 11/2014 | Robinson |
| 2002/0118457 | A1 | 8/2002 | Dowski, Jr. |
| 2002/0163482 | A1 | 11/2002 | Sullivan |
| 2002/0195548 | A1 | 12/2002 | Dowski, Jr. et al. |
| 2003/0057353 | A1 | 3/2003 | Dowski, Jr. et al. |
| 2003/0169944 | A1 | 9/2003 | Dowski, Jr. et al. |
| 2003/0173502 | A1 | 9/2003 | Dowski, Jr. et al. |
| 2004/0145808 | A1 | 7/2004 | Cathey, Jr. et al. |
| 2004/0190762 | A1 | 9/2004 | Dowski, Jr. et al. |
| 2004/0228005 | A1 | 11/2004 | Dowski, Jr. |
| 2004/0257543 | A1 | 12/2004 | Dowski, Jr. et al. |
| 2005/0088745 | A1 | 4/2005 | Cathey, Jr. et al. |
| 2005/0117114 | A1 | 6/2005 | Jiang |
| 2005/0129327 | A1 | 6/2005 | Hillis et al. |
| 2005/0197809 | A1 | 9/2005 | Dowski, Jr. |
| 2005/0264886 | A1 | 12/2005 | Dowski, Jr. |
| 2009/0284489 | A1 | 11/2009 | Batchko |
| 2011/0075257 | A1* | 3/2011 | Hua ..................... G02B 27/017 359/464 |
| 2012/0075696 | A1* | 3/2012 | Jung ........................ F41G 1/38 359/401 |
| 2015/0178980 | A1 | 6/2015 | Bublitz et al. |
| 2015/0205126 | A1* | 7/2015 | Schowengerdt .......... G06T 7/73 345/633 |
| 2015/0277129 | A1* | 10/2015 | Hua ................... G02B 27/0101 359/462 |
| 2015/0346495 | A1* | 12/2015 | Welch ................ G02B 27/0172 345/8 |

FOREIGN PATENT DOCUMENTS

| | | |
|---|---|---|
| JP | H 11-196315 | 7/1999 |
| JP | 2006-333229 | 12/2006 |
| WO | WO 2004/063989 | 7/2004 |
| WO | WO 2005/040909 A1 | 5/2005 |
| WO | WO 2014/062912 A1 | 4/2014 |

OTHER PUBLICATIONS

Bascle et al, "Motion Deblurring and Super-resolution from an Image Sequence" ECCV'96.

Cathey, W. Thomas et al., "New paradigm for imaging systems," Applied Optics, vol. 41, No. 29, Oct. 10, 2002, pp. 6080-6092.

European Search Report, EP06253130, Sep. 26, 2005, 7 pages.

Fales, C.L. et al., "Imaging System Design for Improved Information Capacity," Applied Optics, Mar. 15, 1984, pp. 872-888, vol. 23, No. 6.

Maeda, Peter Y. et al., "Integrating lens design with digital camera simulation," 5678 SPIE Proceedings SPIE Electronic Imaging, San Jose, CA, Feb. 2005, pp. 48-58.

Japanese Office Action, Japanese Application No. 2009-075210, Apr. 16, 2013, 6 pages (with concise explanation of relevance).

United States Office Action, U.S. Appl. No. 12/079,555, Jan. 31, 2014, 7 pages.

United States Office Action, U.S. Appl. No. 12/079,555, Feb. 29, 2012, 16 pages.

United States Office Action, U.S. Appl. No. 12/079,555, May 11, 2011, 14 pages.

United States Office Action, U.S. Appl. No. 14/551,998, Oct. 29, 2015, 11 pages.

Hu, X. et al., "Design and Assessment of a Depth-Fused Multi-Focal-Plane Display Prototype," Journal of Display Technology, 2014, pp. 308-316, vol. 10, No. 4.

Hu, X., "Distinguished Student Paper: A Depth-Fused Multi-Focal-Plane Display Prototype Enabling Focus Cues in Stereoscopic Displays," in SID Symposium Digest of Technical Papers, Wiley Online Library, 2011, pp. 691-694, vol. 42.

Liu, S. et al., "Time-Multiplexed Dual-Focal Plane Head-Mounted Display with a Liquid Lens," Optics Letters, 2009, pp. 1642-1644, vol. 34, No. 11.

Liu, S. et al., "An Optical See-Through Head Mounted Display with Addressable Focal Planes," IEEE ACM, 2008, pp. 33-42.

Liu, S. et al., "A Systematic Method for Designing Depth-Fused Multi-Focal Plane Three-Dimensional Displays," Optics Express, 2010, pp. 11562-11573, vol. 18, No. 11.

Love, G.D. et al., "High-Speed Switchable Lens Enables the Development of a Volumetric Stereoscopic Display," Optics Express, 2009, pp. 15716-15725, vol. 17, No. 18.

Mackenzie, K. J. et al., "Accommodation to Multiple-Focal-Plane Displays: Implications for Improving Stereoscopic Displays and for Accommodation Control," Journal of Vision, 2010.

Ravikumar, S. et al., "Creating Effective Focus Cues in Multi-Plane 3d Displays," Optics Express, 2011, pp. 20940-20952, vol. 19, No. 21.

Shibata et al., "The Zone of Comfort: Predicting Visual Discomfort with Stereo Displays," Journal of Vision, 2011, pp. 1-29, vol. 11, No. 8.

\* cited by examiner

FIG. 1a

SURFACE DATA SUMMARY:

| Surf | Type | Radius | Thickness | Glass | Diameter | Conic | Comment |
|---|---|---|---|---|---|---|---|
| OBJ | STANDARD | Infinity | 30 | | 24 | 0 | |
| 1 | STANDARD | Infinity | 7.9774 | | 25 | 0 | 35mm lens front |
| 2 | PARAXIAL | - | 10.12 | | 25 | - | 35mm lens back |
| 3 | STANDARD | Infinity | .12 | | 40 | 0 | Housing |
| 4 | STANDARD | Infinity | 0.95 | N-BK7 | 40 | 0 | Cover glass front |
| 5 | STANDARD | Infinity | 0.3 | | 40 | 0 | Cover glass back |
| 6 | STANDARD | Infinity | 4.05 | | 8.6 | 0 | Internal aperture |
| STO | STANDARD | 17.5 | 0.5956663 | OL1224_VIS | 8.6 | 0 | Adaptive surface ZZ-6-18 |
| 8 | STANDARD | 1.3564434 | 1.5 | SF1516 | 6.5 | 6.0564404 | Container glass front |
| 9 | STANDARD | Infinity | .11 | | 8.6 | 0 | Container glass back |
| 10 | STANDARD | 32.56398 | 18.35 | | 25 | 0 | 35mm lens back |
| 11 | PARAXIAL | Infinity | 9.145 | | 25 | - | |
| 12 | STANDARD | Infinity | 38.6416 | | 25 | 0 | 35mm lens front |
| 13 | STANDARD | Infinity | 17.1315 | | 25 | 0 | 25mm lens front |
| 14 | PARAXIAL | Infinity | 6.5 | | 25 | - | |
| 15 | STANDARD | Infinity | 2 | | 25 | 0 | 25mm lens back |
| 16 | STANDARD | Infinity | 16.5 | | 30 | 0 | Beamsplitter |
| 17 | STANDARD | 7.8 | 0.55 | 377871 | 12 | -0.25 | Cornea |
| 18 | STANDARD | 6.5 | 2.97 | 337613 | 12 | -0.25 | Aqueous |
| 19 | PARAXIAL | Infinity | 0 | 337615 | 0 | - | Iris |
| 20 | STANDARD | 12 | 3.767 | 420519 | 8.132562 | -7.818749 | Lens |
| 21 | STANDARD | -5.224557 | 16.713 | 336611 | 9.8 | -1.353971 | Vitreous |
| IMA | STANDARD | -13.4 | | 336611 | 26 | 0 | RETINA |

MULTIFOCAL DISPLAY

CROSS-REFERENCE TO RELATED APPLICATION(S)

This application claims priority under 35 U.S.C. §119(e) to U.S. Provisional Patent Application Ser. No. 62/084,315, "Design, Assembly and Operation of a Liquid Lens-Based Multifocal Display for Augmented Reality," filed Nov. 25, 2014. The subject matter of all of the foregoing is incorporated herein by reference in its entirety.

BACKGROUND

1. Field of the Invention

This disclosure relates generally to multifocal displays.

2. Description of Related Art

Three-dimensional (3D) or stereoscopic displays are important for many applications, such as medical imaging, entertainment, virtual prototyping, and scientific visualization. Stereoscopic displays conventionally suffer from mismatched convergence and accommodation cues. This conflict hinders visual performance and causes visual fatigue.

Multifocal displays are one approach that has attempted to address the convergence-accommodation conflict. Multifocal displays (MFDs) typically use rapid temporal and focal modulation of a series of 2-dimensional (2D) images to render 3D scenes. This series of images is typically focused at parallel planes positioned at different, discrete distances from the viewer. The number of focal planes directly affects the viewers' eye accommodation and 3D perception quality of a displayed scene. However, multifocal displays require a high-speed focus actuator. In addition, the shifting location of the focal plane can result in changes in magnification. Although this magnification dependence can be computationally corrected by adjusting the input images, this adds to the system complexity.

Therefore, there is a need for better multifocal displays.

SUMMARY

The present disclosure overcomes the limitations of the prior art by providing a multifocal display for rendering a 3D scene as a series of 2D images. In one aspect, the multifocal display includes a display, an optical imaging system, a refractive focus actuator and a controller. The display renders the 2D images. The optical imaging system is image-side telecentric and creates an image of the display. The focus actuator is positioned at the pupil of the optical imaging system. Thus, the focus actuator alters a location of the image of the display but does not significantly alter a size of the image. The controller coordinates adjustment of the focus actuator with rendering of the 2D images on the display. In some embodiments, the refractive focus actuator is a deformable liquid lens and the waveform driving the liquid lens is designed to reduce ringing in the liquid lens.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

FIG. 1b is the optical prescription for the multi-focal display of FIG. 1a.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
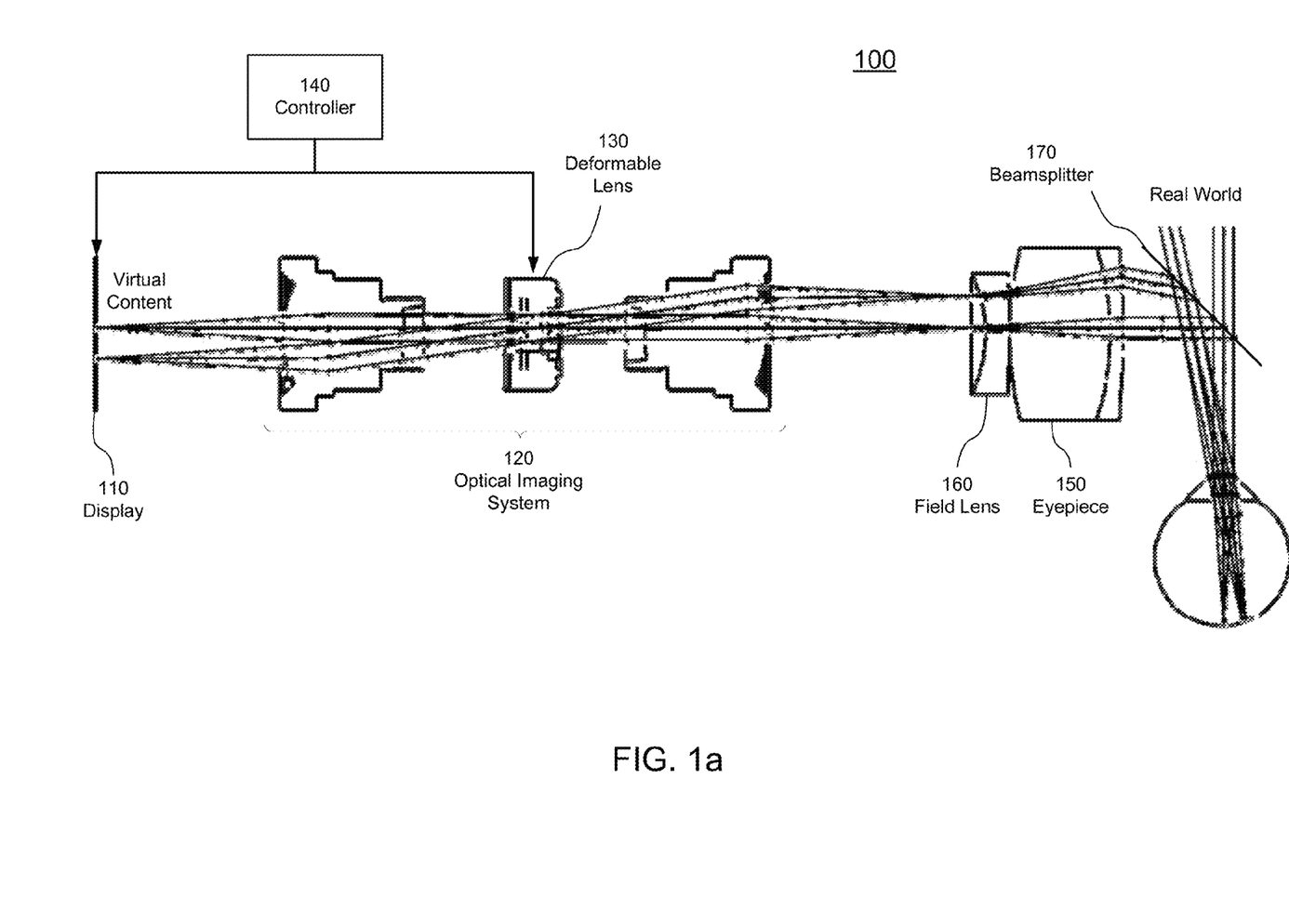
FIG. 1a is a schematic of a multifocal display that implements augmented reality for a single eye.

FIG. 1a is a schematic of a multifocal display 100 that implements augmented reality for a single eye. It uses a display 110, an optical imaging system 120, a refractive focus actuator 130 located in the pupil plane of the optical imaging system such that the display is doubly telecentric, a controller 140, a negative field lens 160, an eyepiece 150, and a beamsplitter 170.

In the example described below, the display 110 is a high-speed DLP (digital light processing) projector, although other displays such as OLEDs and LCDs could also be used. The optical imaging system 120, which is the primary relay system of the multifocal display, is implemented by high-quality camera lenses in a 4-f configuration, and the refractive focus actuator is a deformable liquid lens. The display 110 in combination with the liquid lens 130 can project six focal planes at distances between 0 and 5 diopters, each at a speed of 60 frames per second (fps) or an aggregate speed of 360 fps for the display 110. The eyepiece 150 and beamsplitter 170 allow the real world to be viewed alongside virtual content with a full field-of-view of 31 degrees in this example. The DLP 110 and liquid lens 130 are synchronized with signals output by a controller 140, which in this case is a high-speed analog I/O device. The operating principles of this multifocal display are described in the following sections.

The following is a list of preferred performance for a multifocal display:

No perceived flicker (2D image display speed preferably at least 60 fps for each focal plane)

Continuous perceived depth (number of focal planes $N_z$ preferably at least 6)

No focal jittering (reduce settling time of the focus actuator)

Increase field-of-view for average pupil size of the eye

Maintain magnification with accommodation for both real and virtual content

Match spatial resolution of the eye (angular resolution with pixel spacing of <1 arcmin)

Match virtual content f/# to the average eye f/#

Increase dynamic range and color accuracy

Figure 1B:
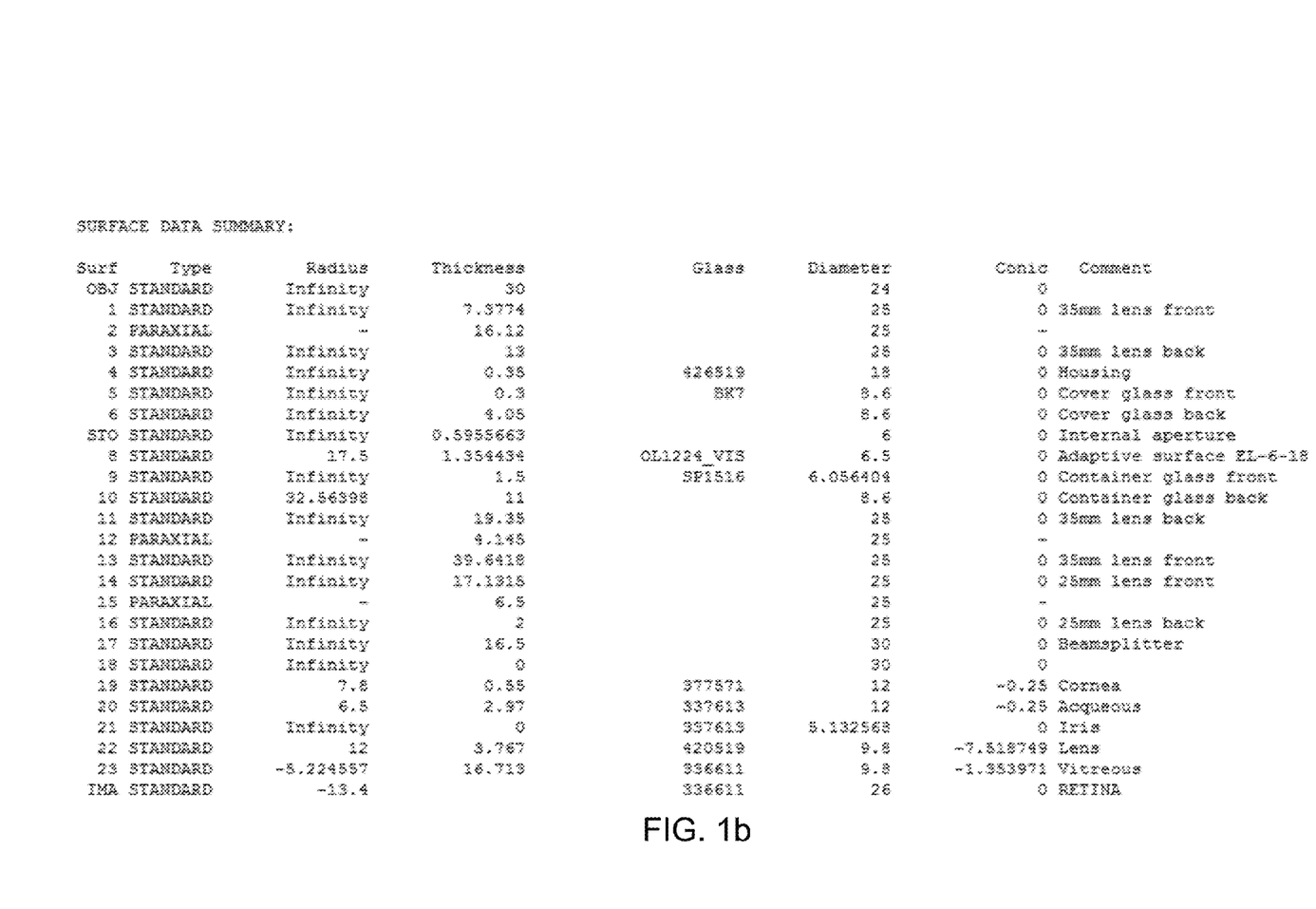

Allow for sufficient eye relief (>=12 mm) and exit pupil diameter (>=4 mm) for standard use Optical Design FIG. 1b is the optical prescription for the multi-focal display of FIG. 1a. Consider each of the components in turn, beginning with a human eye. In this example, we use a model of the human eye, which accounts for curvature, thickness, diameter, and index of refraction for the cornea, aqueous humor, iris, lens, vitreous body, and retina. The model accounts for optical performance of the eye focusing anywhere between the near point to infinity. Intermediary accommodation models are desirable to determine the perceptual accuracy of the focus cues produced by the multi-focal display.

Figure 2A:
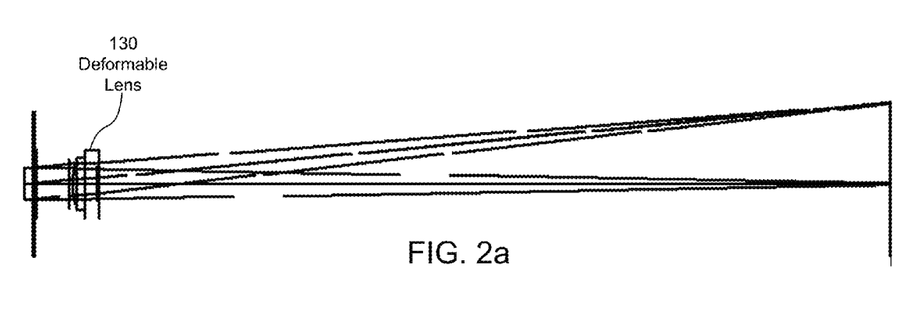
FIG. 2a shows a Zemax model for a deformable liquid lens.
Figure 2B:
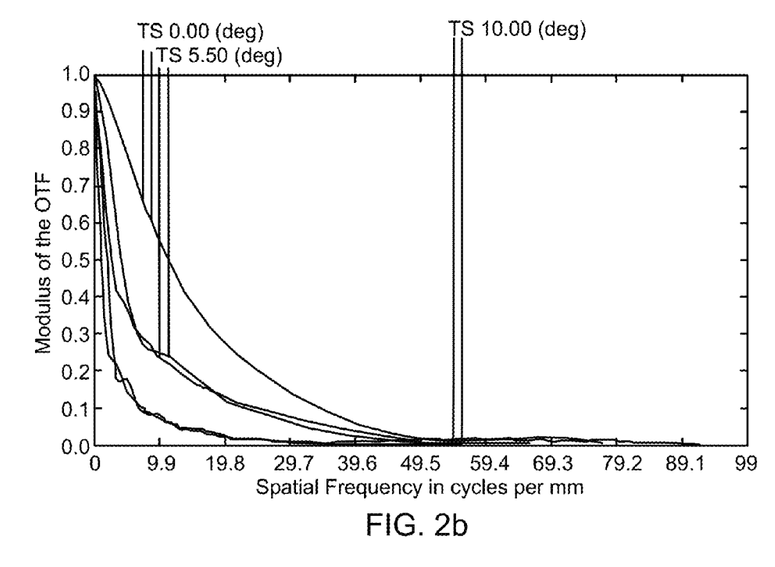
FIG. 2b is an MTF plot of the deformable liquid lens at one focal distance.

The deformable liquid lens 130 is the Optotune EL-6-18. FIG. 2a shows the optical layout of the liquid lens 130, and FIG. 2b shows a modulation transfer function (MTF) for this focus actuator. Placing the liquid lens in a pupil plane results in several advantages. First, this configuration results in the maximum focal sweep range. Second, the lens can be placed at the aperture stop of the system, resulting in image-side telecentricity for the optical imaging system 120. The former is advantageous for modulation speed and settling time; the latter for constant magnification image display.

Figures 3A, 3B:
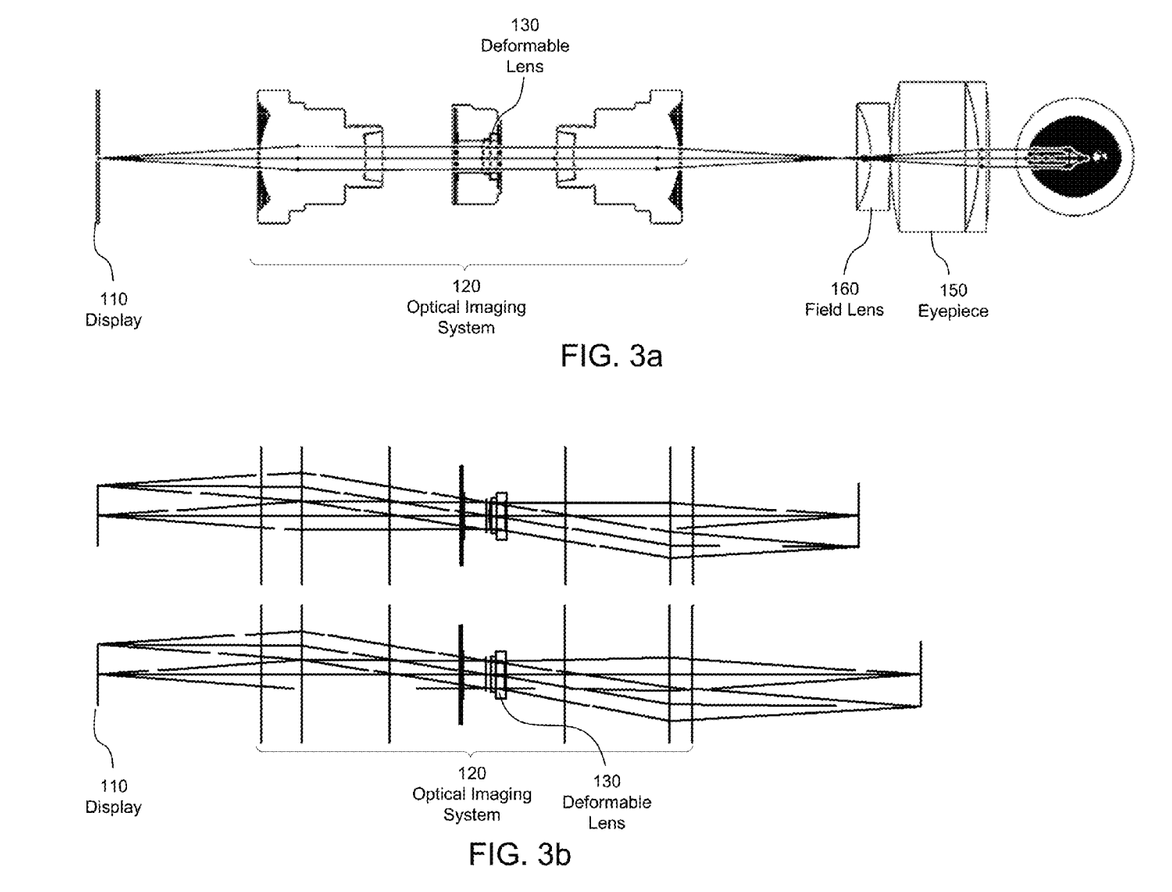
FIG. 3a is a schematic of the optical imaging system within the multi-focal display.
FIG. 3b illustrates change of image position when the liquid lens is deformed.

FIG. 3a is a schematic of the optical imaging system within the multi-focal display, and FIG. 3b illustrates change of image position when the liquid lens is deformed. The optical imaging system 120 of the multifocal display uses two 35 mm camera lenses configured in a 4-f imaging system. This placement provides the double-telecentric design described in more detail below. The liquid lens is placed between the two camera lenses, such that focus modulation causes the position of the primary image to change, with a minimum change in magnification, as shown in FIG. 3b.

Returning to FIG. 1, the eyepiece 150 impacts the field of view and quality of the image on the retina, the size of the exit pupil, and the depth of field. Ideally, the exit pupil spans the eye's entire iris and remains fixed axially regardless of the additional power imparted by the liquid lens. In the case of an image-side telecentric optical relay with an eyepiece of focal length $f_e$, the size of the exit pupil is given by $$D_{XP} = \frac{n_e f_e D_{stop}}{n_o f_o} \quad (1)$$

where n, f, and $D_{stop}$ respectively denote the index of refraction, focal length, and aperture stop diameter and the subscripts e and o respectively denote eyepiece and objective parameters. Since the exit pupil is located within the eye's anterior chamber, $n_e$ is given by the refractive index of the aqueous fluid, which is about 1.34.

When using a single-lens eyepiece 150 with an image-side telecentric relay 120 from the DLP to the primary image plane, there exists a tradeoff between exit pupil size, focal modulation sensitivity, and image size. In the example multifocal display shown in FIG. 1, we use a 25 mm eyepiece 150, 35 mm objective lenses for the optical imaging system 120, and the liquid lens 130 has an aperture diameter of 6 mm. This yields an exit pupil of 4.3 mm, which matches the eye well for indoor lighting.

Figure 4:
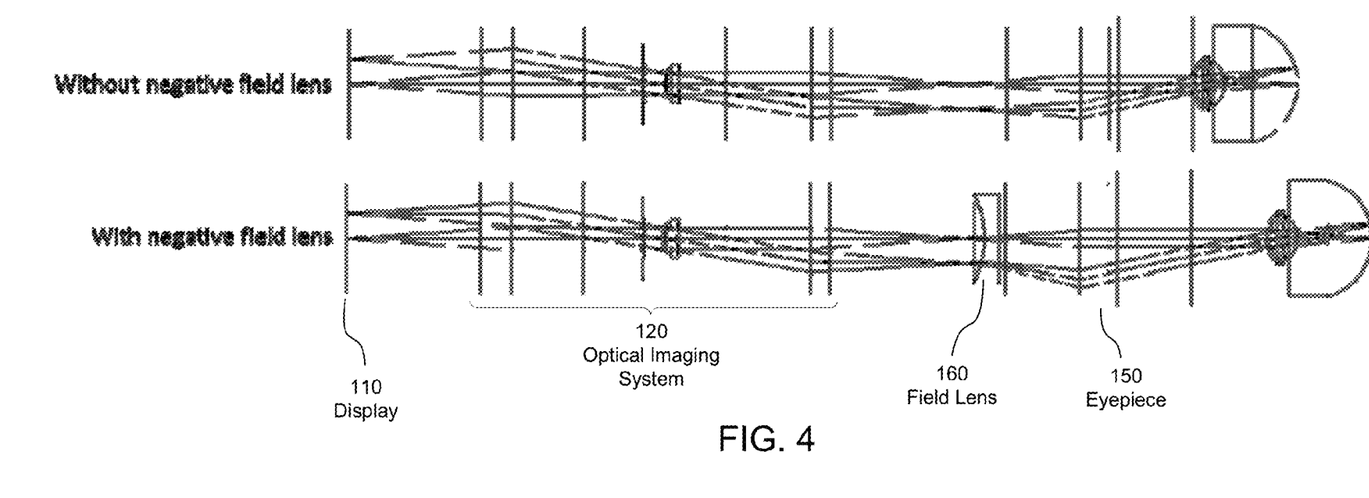
FIG. 4 illustrates increase of eye relief resulting from use of a negative field lens.

A negative field lens 160, with f=−75 mm, is located between the tunable lens 130 and the eyepiece 150. This field lens 160 is used to enlarge the eye relief, which is defined as the working distance between the display hardware and the eye. FIG. 4 illustrates increase of eye relief resulting from use of a negative field lens. The top optical train in FIG. 4 shows the design without the field lens 160, and the bottom optical train in FIG. 4 shows the design with the field lens 160. An enlarged eye relief improves comfort and is beneficial for viewers wearing prescription glasses. Using a 12 mm eye relief, we obtain a 31-degree full field-of-view.

A non-polarizing plate beamsplitter 170 is used to combine real and virtual content. The beamsplitter 170 is 50% reflective and 50% transmissive. The proportions can be optimized based on the light throughput of the multifocal display.

A TI LightCrafter4500 DLP projector is used as the high-speed image display 110. It can project 6-bit grayscale images at a frame rate of 400 fps, with a minimum exposure period of 2.5 ms.

In addition to the liquid lens 130, the system 100 may include other active elements such as an adjustable aperture. An electronically adjustable aperture can change the f/# for a given focal plane, which affects the depth-of-field (focus cue strength) for the image content. Focus control and f/# control can both be used to optimize scene rendering with a given number of focal planes. Other adjustable elements could include fast modulated LEDs or LC shutters for illumination control, which can be used to adjust the brightness of each focal plane.

Controller Design

A frame rate of 360 fps is used to display six focal planes at 60 fps each, as described above. The frame rate applies to the projector display 110, as well as the liquid lens 130, which is modulated with an analog voltage signal. This waveform selection is influenced by the response time $\tau_r$ of the lens 130, which in this example is on the order of 1-3 ms (depending on the dioptric input step size). Ideally, the lens should be stationary for the duration of the exposure period at every focal plane. In practice, the liquid lens settling time is on the order of 5 times the duration of the response time. Thus, the ideal waveform minimizes the "activation time" (sum of response time plus settling time), which is approximately $6\tau_r$. The two design parameters responsible for minimizing the activation time are the waveform itself and any filtering applied to the waveform.

If the focal planes are numbered 1-6 in order of their location (either progressing from farthest away from the viewer to closest, or progressing from closest to farthest away), one possible drive signal realizes the focal planes in order from focal plane 1 to focal plane 6 and then resets to focal plane 1 (i.e., a staircase waveform). However, the large drop at the end of the staircase when returning from focal plane 6 to focal plane 1 can cause overshoot and increase the activation time. This can cause an incorrect focus and a blurred image for focal plane 1 (or focal plane 6 for a descending staircase). The artifacts are caused by the drive mechanism of the liquid lens and become more pronounced with increased dioptric spacing between focal planes.

Figure 5:
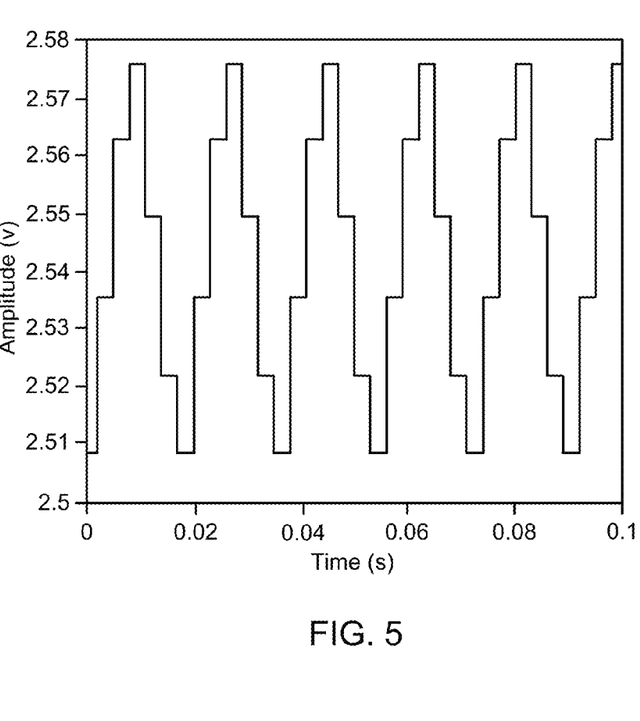
FIG. 5 is a timing diagram of a pyramid-shaped waveform used to drive the deformable liquid lens.

FIG. 5 is a timing diagram of a pyramid-shaped waveform used to drive the deformable liquid lens. This waveform steps through the focal planes in the following order: 1, 3, 5, 6, 4, 2. In other words, the odd focal planes are realized in a temporal order that is monotonically ascending (i.e., focal planes 1, 3, 5) and then the even focal planes are realized in a temporal order that is monotonically descending (i.e., focal planes 6, 4, 2). Of course, the order can be reversed: descending for odd focal planes and ascending for even focal planes. By distributing the voltage change throughout the waveform, the effective focal range swept by the liquid lens can be increased, while maintaining an accurate depth position at each focal plane. Other orders of focal planes that reduce lens ringing or increase image quality can be used.

Even with a pyramid-shaped waveform, the settling time may still result in an unstable image or "focal jitter" for all planes. Jitter can be caused by underdamping of the liquid lens. A smoothed waveform can reduce the jitter. However, too much smoothing results in overdamping, which also increases the activation time of the liquid lens. Both of these cases result in perceptual artifacts of the virtual content. Ideally, the driving waveform critically damps the lens activation time.

In one approach, a method for artifact reduction in a liquid lens-based multifocal display is developed by deriving a model for image formation considering the step response of a liquid lens. Let the multifocal display project an image sequence $f(x,y,t)$. Let us also divide the time into subintervals $T_k$: $(t_k, t_k+1)$, where $k=1, \ldots, N_z$ and $t_1=0$. Within each interval $T_k$, we assume the target image data to be constant in time. That is, $$f(x,y,t) = f_k(x,y),$$

$$t_k \le t < t_{k+1},$$

$$k=1, \ldots, N_z, \quad (2)$$

We also assume that $N_z$ is equal to the number of focal planes available. Namely the 3D scene image data is divided into $N_z$ planar images and displayed on $N_z$ depth planes. In this case, to get projection on $N_z$ depth planes, we drive the liquid lens by a voltage waveform that is a piecewise constant function:

$$v(t) = \sum_{k=1}^{N_z} \Delta_k u(t - t_k), \quad (3)$$

where $u(t)$ is a unit step function and $\Delta_k = v(t_k) - v(t_k-1)$ is a voltage change step at time $t_k$ (either a positive or negative voltage change). Given the impulse response of the liquid lens, $h(t)$, and the driving voltage waveform $v(t)$, the depth z at which the liquid lens forms an image can be modeled as:

$$z(t) = \alpha(v*h)(t) = \alpha \int_{-\infty}^{\infty} v(t-t')h(t')dt' = \alpha W(t), \quad (4)$$

where * denotes the convolution and $\alpha$ is a constant that translates the voltage values to physical depths. To simplify notation, we have introduced $W(t)=(v*h)(t)$. The lens response $h(t)$ might exhibit ringing due to the settling time of the lens.

Given the waveform $W(t)$, and hence the depth $z(t)=\alpha W(t)$ at which the stimulus $f$ is displayed, the image perceived by the eye accommodating to a distance $z_e$ of a virtual multifocal display volume is given by $$g(x',y',z_e) = \int_x \int_y \int_t f(x,y,t) p(x-x', y-y', z_e - \alpha W(t)) dx dy dt, \quad (5)$$

where p represents the system's depth-dependent point spread function (PSF). This PSF includes the characteristics of the optical display system and the response of the human eye. We assume an aberration-free PSF p. That means that for each accommodation distance $z_e$, i.e. the eye focusing at distance $z_e$, the PSF is the same. However, we still consider the PSF of the system at a distance $z(t)$ that is different from the accommodation of the eye $z_e$, i.e., the defocused PSF $p(x, y, z_e-z(t))=p(x, y, z_e-\alpha W(t))$.

Figure 6:
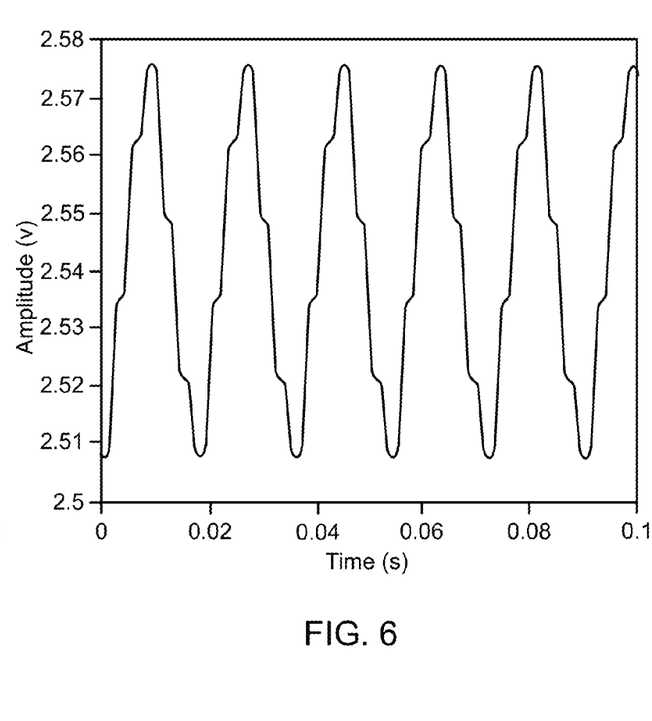
FIG. 6 shows a filtered version of the drive waveform of FIG. 5.

If we now split the integration over time into $N_z$ integrations over time interval $T_k$, we obtain:

$$g(x', y', z_e) = \int_x \int_y \sum_{k=1}^{N_z} \int_{t_k}^{t_{k+1}} f(x, y, t) p(x - x', y - y', z_e - \alpha W(t)) dx dy dt, \quad (6a)$$

$$= \sum_{k=1}^{N_z} \int_x \int_y \int_{t_k}^{t_{k+1}} f_k(x, y) p(x - x', y - y', z_e - \alpha W(t)) dx dy dt,$$

where we have used Eq. 2. By simple regrouping, we obtain:

$$g(x', y', z_e) = \sum_{k=1}^{N_z} \int_x \int_y f_k(x, y) \left[ \int_{t_k}^{t_{k+1}} p(x - x', y - y', z_e - \alpha W(t)) dt \right] dx dy, \quad (6b)$$

$$= \sum_{k=1}^{N_z} \int_x \int_y f_k(x, y) p_k(x - x', y - y', z_e) dx dy,$$

where $p_k$ is the defocused PSF integrated over the interval $T_k$, which also accounts for the ringing of the liquid lens. We can see that this integrated PSF depends on the waveform driving the lens, i.e., depends on $W(t)$. When the voltage waveform $v(t)$ is simply piecewise continuous and contains sharp discontinuities, as in FIG. 5, the lens response will contain ringing due to the Gibbs effect. In order to reduce this effect and obtain focused images $g(x',y',z_e)$ on the retina, we modify the driving voltage waveform $v(t)$ by filtering it with another waveform $\gamma(t)$. By convolving $v(t)$ with $\gamma(t)$, we can smoothen $v(t)$ to avoid Gibbs effect. FIG. 6 shows a filtered version of the drive waveform of FIG. 5.

Mathematically, the modified lens response becomes:

$$z(t) = \alpha((v*\gamma)*h)(t) \quad (7)$$
$$= \alpha(v*(\gamma*h))(t)$$
$$= \alpha(v*(h*\gamma))(t)$$
$$= \alpha((v*h)*\gamma)$$
$$= \alpha(W*\gamma)(t).$$

The equalities above are due to commutativity and associativity of convolution. With this new filtering, the image captured on the retina of an accommodated eye becomes:

$$g_\gamma(x', y', z_e) = \quad (8)$$

$$\sum_{k=1}^{N_z} \int_x \int_y f_k(x, y) \left[ \int_{t_k}^{t_{k+1}} p(x - x', y - y', z_e - \alpha(W*\gamma)(t)) dt \right] dx dy.$$

Finally, we would like to maximize the sharpness of the retinal images when the eye accommodates to each designed depth plane of the multifocal display. If we denote the distances of these depth planes as $z_i$, i=1, ... $N_z$, a quality metric Q can be defined as:

$$Q(\gamma) = \sum_{i=1}^{N_z} \Omega[g_\gamma(x', y', z_i)]. \quad (9)$$

where $\Omega$ can be any image quality metric, such as sharpness, for example MTF20, MTF30, or some variation of a contrast, spatial frequency content, or entropy-based image sharpness metric. Therefore, finding the optimal filter $\gamma$ can be posed as the following optimization problem:

$$OPT1: \hat{\gamma} = \underset{\gamma}{\operatorname{argmax}} Q(\gamma) = \underset{\gamma}{\operatorname{argmax}} \sum_{i=1}^{N_z} \Omega[g_\gamma(x', y', z_i)]. \quad (10)$$

Alternatively, one can use a different metric for optimizing $\gamma$, such as projected depth plane error $E(\gamma) = \|z - \tilde{z}\|_2^2$ where $z = \{z_k\}_{k=1}^{N_z}$ is a vector containing the design focal plane distances and $\tilde{z} = \{\tilde{z}_k\}_{k=1}^{N_z}$ is a vector containing the focal plane distances achieved by the system. In this case, the optimization problem becomes:

$$OPT2: \hat{\gamma} = \underset{\gamma}{\operatorname{argmin}} E(\gamma) = \underset{\gamma}{\operatorname{argmin}} \|z - \tilde{z}\|_2^2. \quad (11)$$

Finally, one can use a combination of both metrics:

$$OPT3: \hat{\gamma} = \quad (12)$$
$$\underset{\gamma}{\operatorname{argmin}} E(\gamma) - \lambda Q(\gamma) = \underset{\gamma}{\operatorname{argmin}} \|z - \tilde{z}\|_2^2 - \lambda \sum_{i=1}^{N_z} \Omega[g_\gamma(x', y', z_i)].$$

where $\lambda$ is a regularization parameter that weighs the importance of maximizing image sharpness (the second term) versus projecting at the correct depths (the first term). Note that sharpness may be reduced for two reasons. First, the filter attenuates high frequencies too much, resulting in over-damping, and the liquid lens sweeps through the focal plane, causing a hazy appearance of focal sweep data. Second, the filter does not attenuate high frequencies enough, resulting in underdamping and strong ringing and an integration of the projected depth slices in- and out of focus.

Since Eq. 12 has a large solution space, we narrow it by considering only Gaussian filters of the form $$\gamma_\sigma(t) = e^{-\frac{\pi t^2}{\sigma^2}}, \quad (13)$$

where $\sigma$ is the filter's standard deviation. The optimization problem from Eq. 12 reduces to $$\hat{\sigma} = \underset{\gamma}{\operatorname{argmin}} \|z - \tilde{z}\|_2^2 - \lambda \sum_{i=1}^{N_s} \Omega[g_{\gamma\sigma}(x', y', z_i)], \quad (14)$$

Possible fluctuations due to the projection of individual bit planes were ignored. Projection at the granularity of bit planes can be included in the model by adding bit plane dependency into the function $f$ and the optical response function $p$.

In one scenario, the exact waveform W(t) may not be known, because the temporal impulse response of the lens h(t) may be unknown. Estimating the true temporal impulse response would involve synchronization with a fast photodiode or high-speed camera and measuring the response time directly for all voltage changes. Given such estimation or otherwise knowledge of W, the solution space of potential waveform filters can be enlarged by including other filters in addition to Gaussian filters, e.g. FIR filters by optimizing over their filter coefficients and their filter taps.

In the case that W is not known, $g(x',y',z_i)$ can still be measured by simulating the observation of a human eye with a camera. By searching through the solution space of $\sigma$, the $\hat{\sigma}$ that provides the best sharpness measured by the sharpness metric $\Omega$ can be determined. The evaluation metric $\Omega$ could also measure temporal behavior of the displayed image.

Although the detailed description contains many specifics, these should not be construed as limiting the scope of the invention but merely as illustrating different examples and aspects of the invention. It should be appreciated that the scope of the invention includes other embodiments not discussed in detail above. For example, the sharpness metric could be implemented as a form of contrast, spatial frequency content, or entropy; the waveform step size can be optimized to fit nonuniform focal plane locations and spacing, and the adjustable aperture's size could be incorporated into these metrics. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, aspects of the invention (e.g., the controller) may be implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules.

What is claimed is:

1. A multifocal display for rendering a 3D scene as a series of 2D images, the multifocal display comprising:
    a display, on which 2D images are rendered;
    an optical imaging system positioned to create an image of the display, wherein the optical imaging system is image-side telecentric, the optical imaging system having a pupil;
    a refractive focus actuator positioned at the pupil of the optical imaging system, wherein adjusting the refractive focus actuator alters a location of the image of the display but does not significantly alter a size of the image; and
    a controller that coordinates adjustment of the refractive focus actuator with rendering of the 2D images on the display, wherein the controller produces a drive signal to adjust the refractive focus actuator and the drive signal optimizes an image error metric of an ideal rendering of 3D scenes versus the 3D scenes rendered on the multifocal display.

2. The multifocal display of claim 1 further comprising: an eyepiece positioned to allow viewing the images of the display.

3. The multifocal display of claim 2 further comprising: an optical combiner positioned to overlay the images of the display on a user's natural view to implement an augmented reality.

4. The multifocal display of claim 2 further comprising: a negative field lens located between the refractive focus actuator and the eyepiece.

5. The multifocal display of claim 2 wherein the multifocal display covers a field of view of at least 30 degrees.

6. The multifocal display of claim 1 wherein the refractive focus actuator is a deformable lens.

7. The multifocal display of claim 6 wherein the deformable lens is a liquid lens that can be adjusted over a range of five diopters.

8. The multifocal display of claim 1 wherein the image error metric is a difference between locations of points in the ideal rendered 3D scenes versus locations of those points in the 3D scenes rendered on the multifocal display.

9. The multifocal display of claim 1 further comprising: an adjustable aperture within the optical imaging system, wherein the controller also coordinates adjustment of the aperture with adjustment of the refractive focus actuator.

10. The multifocal display of claim 1 wherein the optical imaging system is also object-side telecentric.

11. The multifocal display of claim 1 wherein the multifocal display can render 3D scenes at a rate of at least 60 scenes per second.

12. A multifocal display for rendering a 3D scene as a series of 2D images, the multifocal display comprising:
    a display, on which 2D images are rendered;
    an optical imaging system positioned to create an image of the display, wherein the optical imaging system is image-side telecentric, the optical imaging system having a pupil;
    a refractive focus actuator positioned at the pupil of the optical imaging system, wherein adjusting the refractive focus actuator alters a location of the image of the display but does not significantly alter a size of the image; and
    a controller that coordinates adjustment of the refractive focus actuator with rendering of the 2D images on the display, wherein the controller adjusts the refractive focus actuator such that the locations of the images are realized in a temporal order that is not monotonically ascending or descending.

13. The multifocal display of claim 12 wherein the controller adjusts the refractive focus actuator such that the locations of the images are realized in a temporal order that is monotonically ascending/descending for the odd image locations and then monotonically descending/ascending for the even image locations.

14. The multifocal display of claim 12 wherein the controller produces a drive signal to adjust the refractive focus actuator and the drive signal is a filtered version of a piece-wise flat signal.

15. The multifocal display of claim 12 wherein the controller produces a drive signal to adjust the refractive focus actuator and the drive signal optimizes an image quality metric of 3D scenes rendered on the multifocal display.

16. The multifocal display of claim 15 wherein the image quality metric accounts for image defocus.

17. A multifocal display for rendering a 3D scene as a series of 2D images, the multifocal display comprising:
    a display, on which 2D images are rendered;
    an optical imaging system positioned to create an image of the display, wherein the optical imaging system is image-side telecentric, the optical imaging system having a pupil;
    a refractive focus actuator positioned at the pupil of the optical imaging system, wherein adjusting the refractive focus actuator alters a location of the image of the display but does not significantly alter a size of the image; and
    a controller that coordinates adjustment of the refractive focus actuator with rendering of the 2D images on the display, wherein the controller produces a drive signal to adjust the refractive focus actuator and the drive signal optimizes an image quality metric of 3D scenes rendered on the multifocal display, wherein the image quality metric accounts for temporal quality.

18. A method for rendering a 3D scene as a series of 2D images on a multifocal display comprising a display, an optical imaging system and a refractive focus actuator, the method comprising:
    rendering on the display 2D images derived from the 3D scene, the optical imaging system creating an image of the display at a location;

adjusting the refractive focus actuator to alter the location of the image of the display, wherein adjusting the refractive focus actuator does not significantly alter a size of the image; and coordinating adjustment of the refractive focus actuator with rendering of the 2D images on the display, wherein adjusting the refractive focus actuator comprises producing a drive signal to adjust the refractive focus actuator and the drive signal optimizes an image error metric of an ideal rendering of 3D scenes versus the 3D scenes rendered on the multifocal display.

19. A controller for use in a multifocal display that renders a 3D scene as a series of 2D images; the multifocal display comprising a display, an optical imaging system that is image-side telecentric, and a refractive focus actuator; the controller coordinating adjustment of the refractive focus actuator with rendering of the 2D images on the display; the controller producing a drive signal to adjust the refractive focus actuator wherein the drive signal optimizes an image error metric of an ideal rendering of 3D scenes versus the 3D scenes rendered on the multifocal display.

20. The controller of claim 19 wherein the drive signal adjusts the refractive focus actuator such that the locations of the images are realized in a temporal order that is not monotonically ascending or descending.

* * * * *